May 17, 1949.  E. R. LOCHMAN  2,470,103
POWER OPERATED DRIVING AND BRAKING MECHANISM
Filed Aug. 30, 1941  7 Sheets-Sheet 1

INVENTOR:
EMIL R. LOCHMAN
BY:
Fred G. Parsons
ATTORNEY.

May 17, 1949. E. R. LOCHMAN 2,470,103
POWER OPERATED DRIVING AND BRAKING MECHANISM
Filed Aug. 30, 1941 7 Sheets-Sheet 2
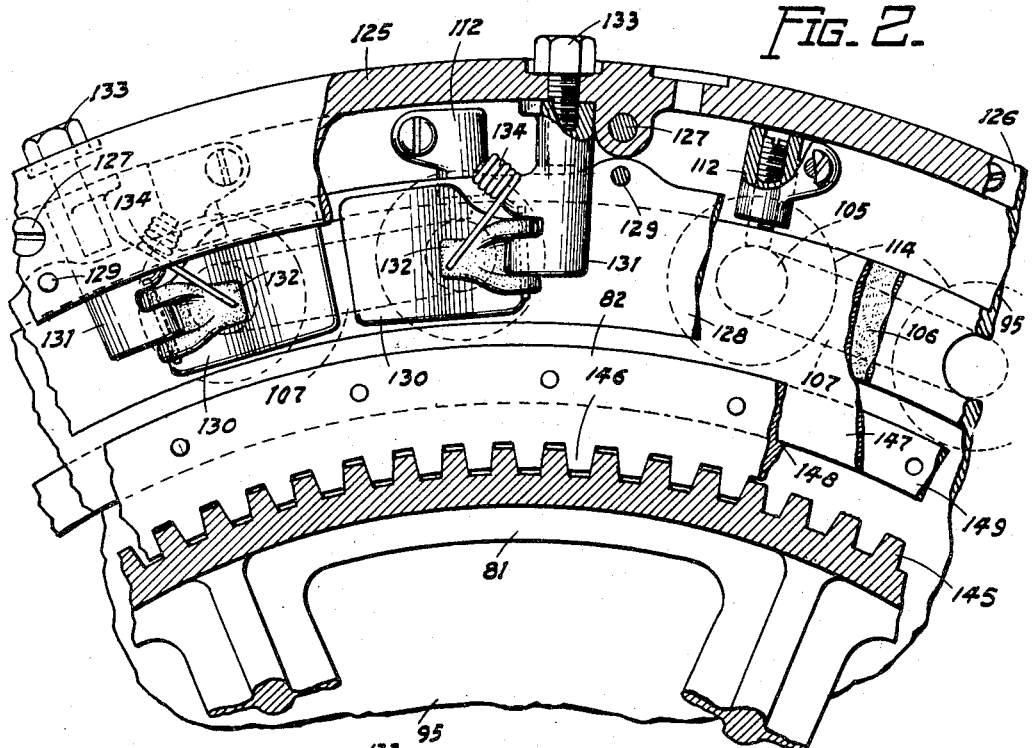
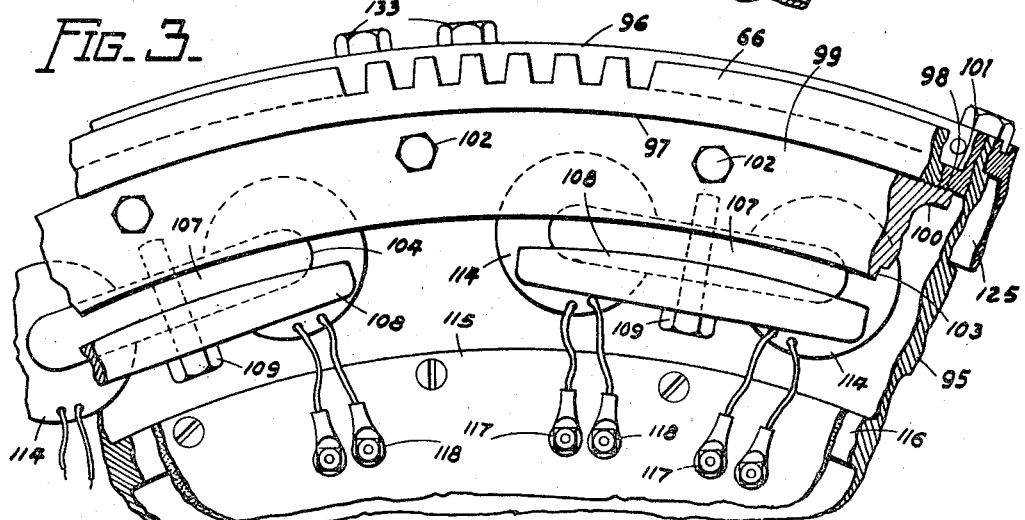
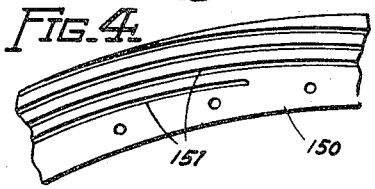
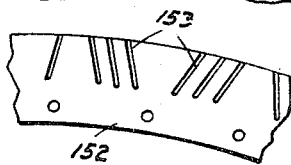
INVENTOR:
EMIL R. LOCHMAN
BY:
*Fred A. Peronix*
ATTORNEY.

May 17, 1949.　　　　E. R. LOCHMAN　　　　2,470,103
POWER OPERATED DRIVING AND BRAKING MECHANISM
Filed Aug. 30, 1941　　　　　　　　　　7 Sheets-Sheet 3
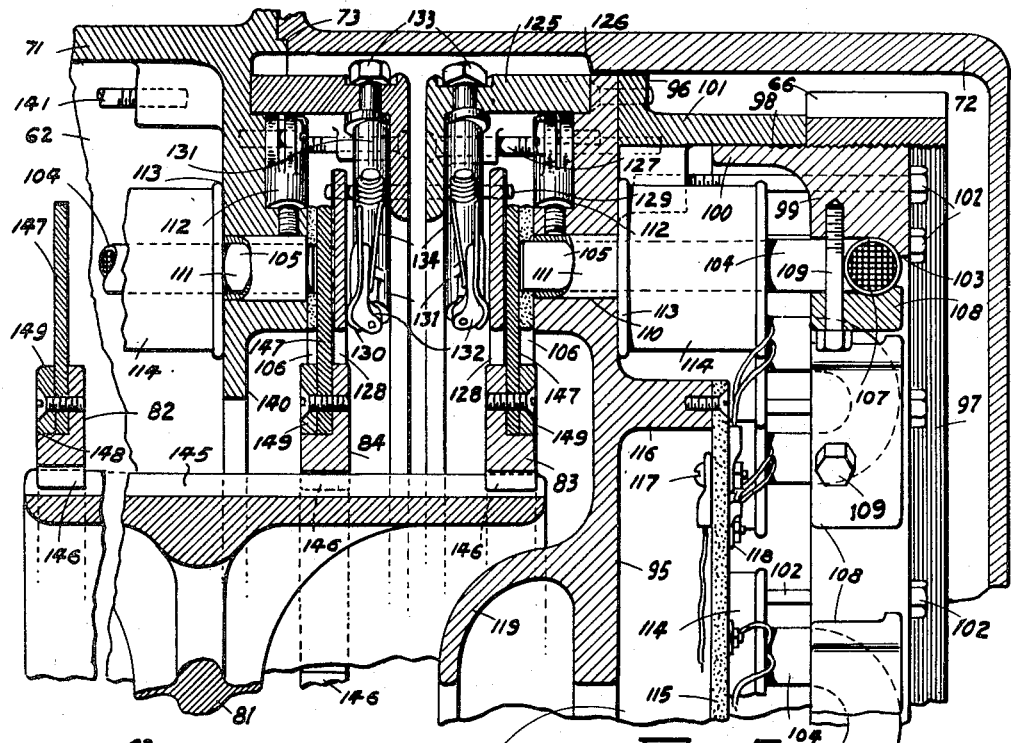
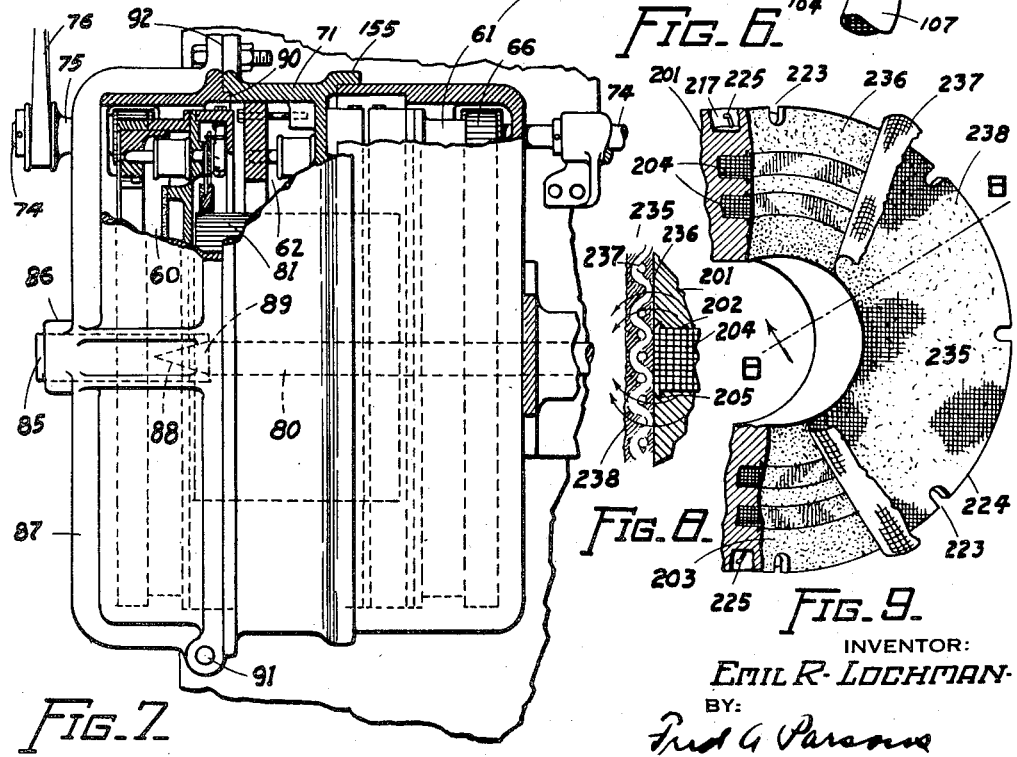
INVENTOR:
EMIL R. LOCHMAN
BY:
Fred G. Parsons
ATTORNEY.

May 17, 1949.  E. R. LOCHMAN  2,470,103
POWER OPERATED DRIVING AND BRAKING MECHANISM
Filed Aug. 30, 1941  7 Sheets-Sheet 4
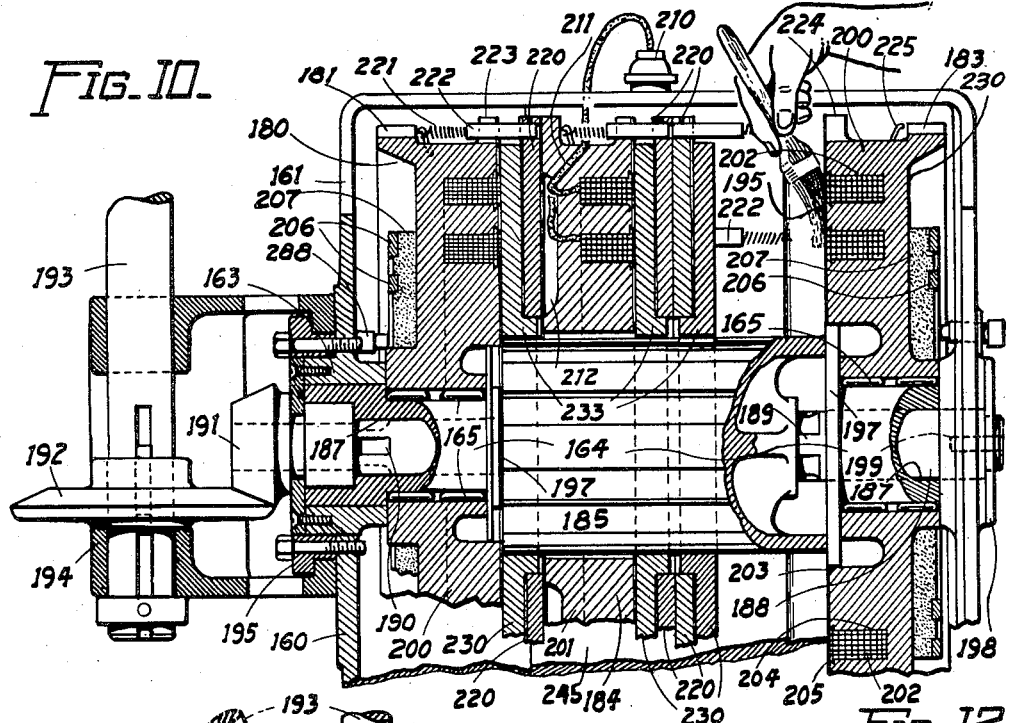
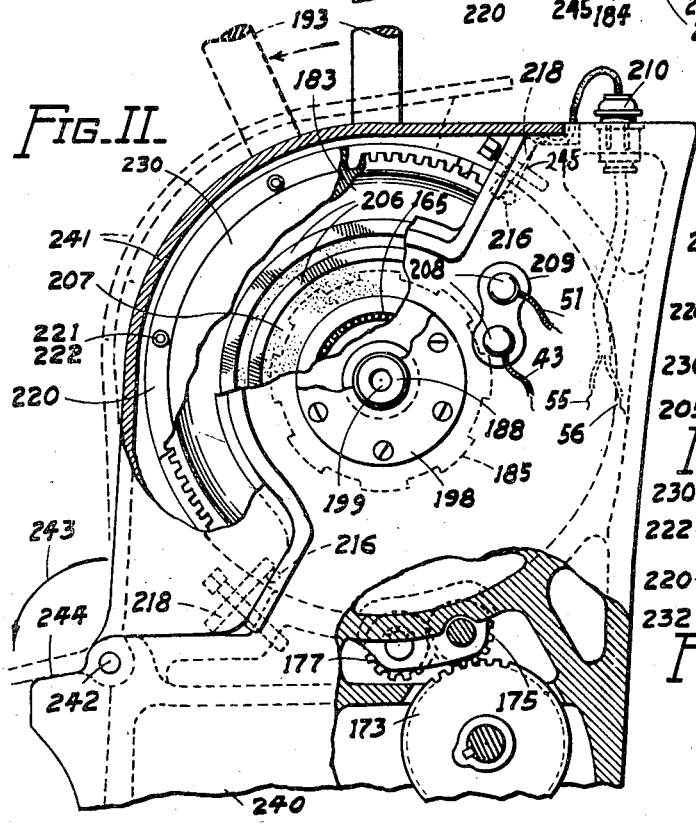
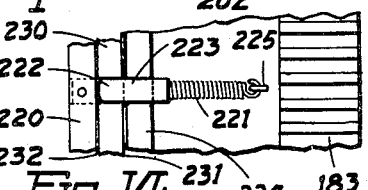
INVENTOR:
EMIL R. LOCHMAN
BY
Fred G. Parsons
ATTORNEY.

May 17, 1949.  E. R. LOCHMAN  2,470,103
POWER OPERATED DRIVING AND BRAKING MECHANISM
Filed Aug. 30, 1941  7 Sheets-Sheet 5

INVENTOR:
Emil R. Lochman
BY:
Fred G. Parsons
ATTORNEY.

May 17, 1949. E. R. LOCHMAN 2,470,103
POWER OPERATED DRIVING AND BRAKING MECHANISM
Filed Aug. 30, 1941 7 Sheets-Sheet 6
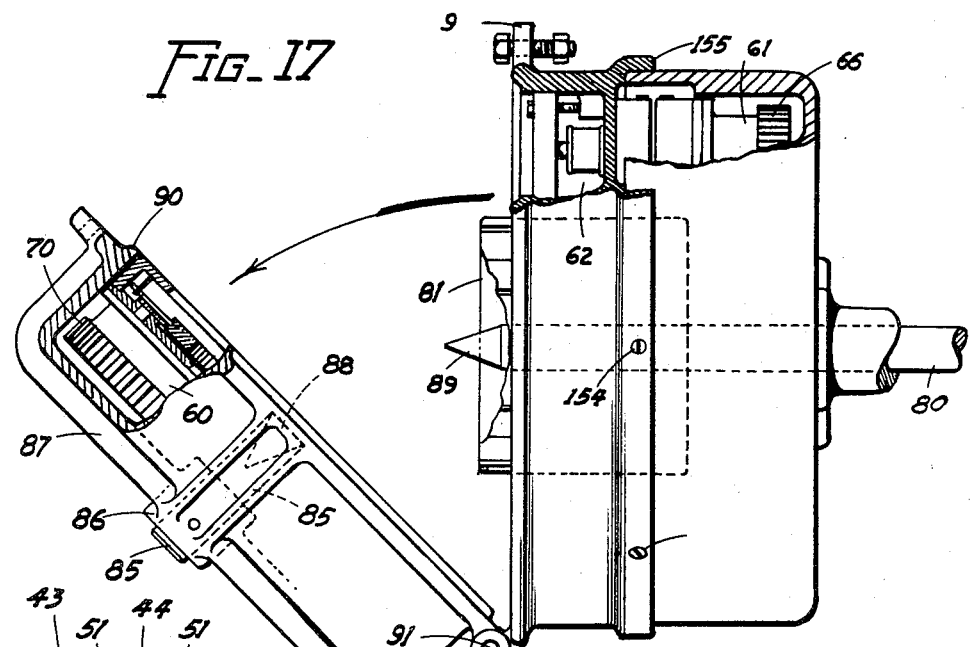
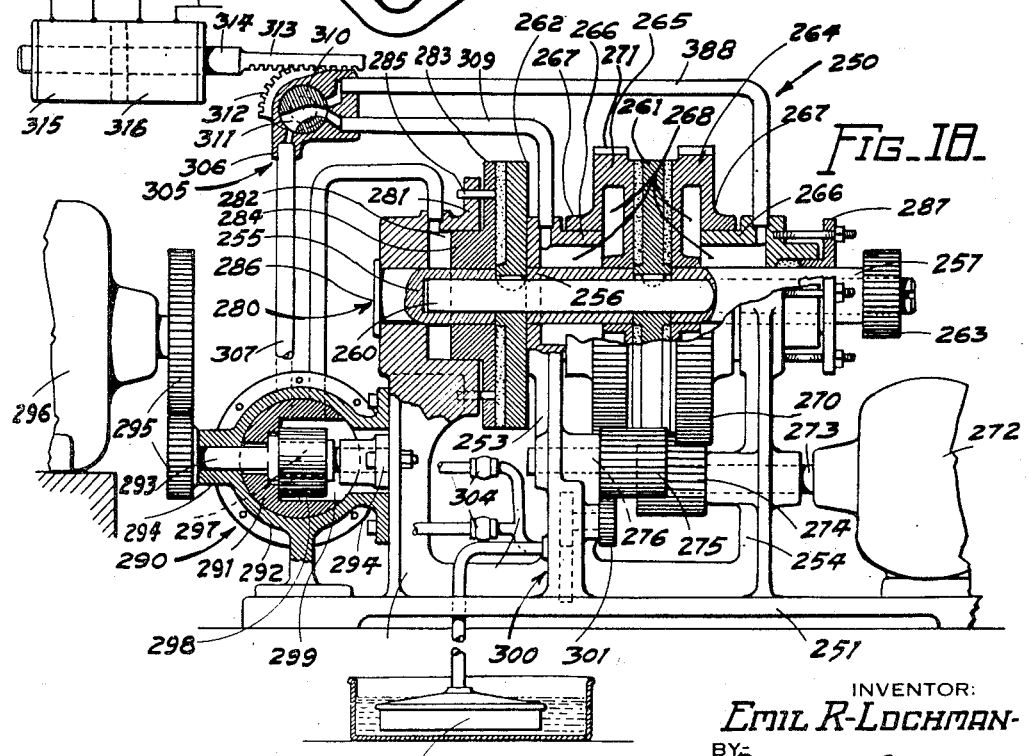
INVENTOR:
Emil R. Lochman
BY Fred G. Parsons
ATTORNEY.

May 17, 1949.   E. R. LOCHMAN   2,470,103
POWER OPERATED DRIVING AND BRAKING MECHANISM
Filed Aug. 30, 1941   7 Sheets-Sheet 7
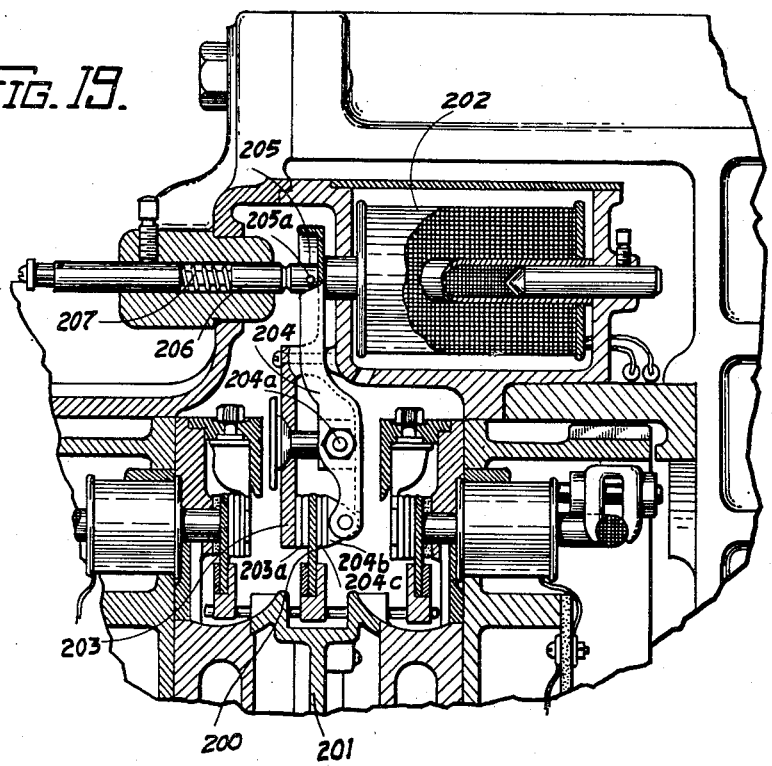
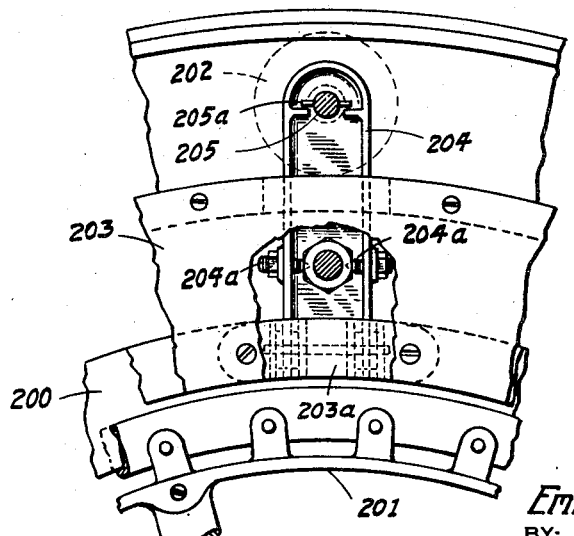
INVENTOR:
Emil R. Lochman.
BY:
Fred G. Parsons
ATTORNEY.

Patented May 17, 1949

2,470,103

UNITED STATES PATENT OFFICE 2,470,103

POWER-OPERATED DRIVING AND BRAKING MECHANISM

Emil R. Lochman, Milwaukee, Wis.

Application August 30, 1941, Serial No. 409,095

31 Claims. (Cl. 192—18)

This invention relates generally to improvements in power drive mechanism and more particularly to an improved clutch and brake mechanism.

The present application is a continuation in part containing claims divided from co-pending application Serial No. 723,105, now Patent 2,254,229 (Re. 22,140) and from co-pending application Serial No. 257,216, filed February 18, 1939, now abandoned.

A general object of the invention is to provide an improved clutch and brake mechanism.

Another object of the invention is to provide an improved clutch and brake mechanism for actuating and controlling the movable elements of a machine tool.

Another object is to provide an improved electromagnetic clutch and brake mechanism capable of intermittent actuation and retardation as current is alternately applied to the clutch element and the brake element.

Another object is to provide an improved clutch and brake mechanism capable of great sensitivity and speed of action.

Another object is to provide an improved power operated clutch and brake mechanism especially adapted to actuate movable elements of a machine tool in response to the guiding action of a tracer mechanism.

Another object is to provide an improved clutch and brake mechanism in which mechanical vibrating devices acting upon a gripping armature in conjunction with a controlled magnetic field, operate to increase the gripping action on an intervening tracing armature and to facilitate periodic release thereof.

Another object is to provide an improved clutch and brake mechanism capable of being directly connected to a movable tool or work support of a machine tool and functioning with great accuracy and speed of operation.

Another object of the invention is to provide an improved mounting for the several parts of the clutch and brake mechanism.

Another object is to provide an improved form of armature which will be relatively free of electromagnetic eddy currents and will tend to free itself of dust accumulations without scratching or otherwise damaging the co-acting clutch plates.

Another object is to provide a clutch and brake mechanism incorporating an improved lining or facing for the frictional surfaces thereof.

Another object is to provide a specially designed high speed magnetic clutch and brake mechanism for co-acting with a control system in operating a machine tool.

Another object is to provide a high speed magnetic clutch and brake unit of greatly simplified construction, which is economical to manufacture and which operates smoothly and speedily to effect smooth and rapid operation of a machine tool.

Another object is to provide a clutch and brake mechanism having frictional facings so arranged that the magnetic gap between the magnet structures and their cooperating armatures is reduced to a minimum to increase the torque transmitting capacity of the mechanism.

A further object is to provide means for renewing the frictional surfaces of the clutch and brake mechanism without removing the frictional facings thereof.

A still further object is to provide an improved renewable coating material for the frictional surface of a clutch or brake mechanism.

The foregoing and other objects and advantages of the present invention, which will become more fully apparent upon reference to the following detailed specification, may be achieved by means of the structure described therein by way of example and illustrated in the accompanying drawing, in which:

Fig. 2 is a fragmentary view in transverse section showing a portion of the cooperating magnetic elements constituting parts of the clutch mechanism.

Fig. 3 is a fragmentary sectional view generally similar to Fig. 2 but taken on a different transverse plane.

Fig. 4 is a detailed fragmentary view of a frictional element of the clutch and brake mechanism showing cleaning grooves in the friction surface.

Fig. 5 is a fragmentary view generally similar to Fig. 4 but showing another form of grooving.

Fig. 6 is a fragmentary view in longitudinal section through a portion of one form of clutch and brake mechanism embodying the invention.

Fig. 7 is a general view of a clutch and brake mechanism embodying the invention, with parts broken away to show the clutch driving mechanism.

Fig. 8 is a greatly enlarged detailed view in longitudinal section through a frictional surface in the mechanism, taken on the line 8—8 of Fig. 9.

Fig. 9 is a fragmentary perspective view of one of the frictional surfaces with the fabric facing turned back to show its relationship with the magnetic elements.

Fig. 10 is a fragmentary view in longitudinal section of a modified form of clutch and brake mechanism embodying the invention, showing the arrangement by which the frictional surface may be renewed.

Fig. 11 is a view in end elevation of a clutch and brake mechanism with parts broken away to show the arrangement for dismantling the clutches and brake to clean and repair them.

Fig. 12 is a fragmentary detailed view in perspective, of means for retaining the brake in operating position.

Fig. 13 is an enlarged detailed view in longitudinal section of part of the mechanism shown in Fig. 10 illustrating the means by which cooperating frictional elements are releasably retained in engagement.

Fig. 14 is a plan view of the arrangement shown in Fig. 13.

Figure 1:
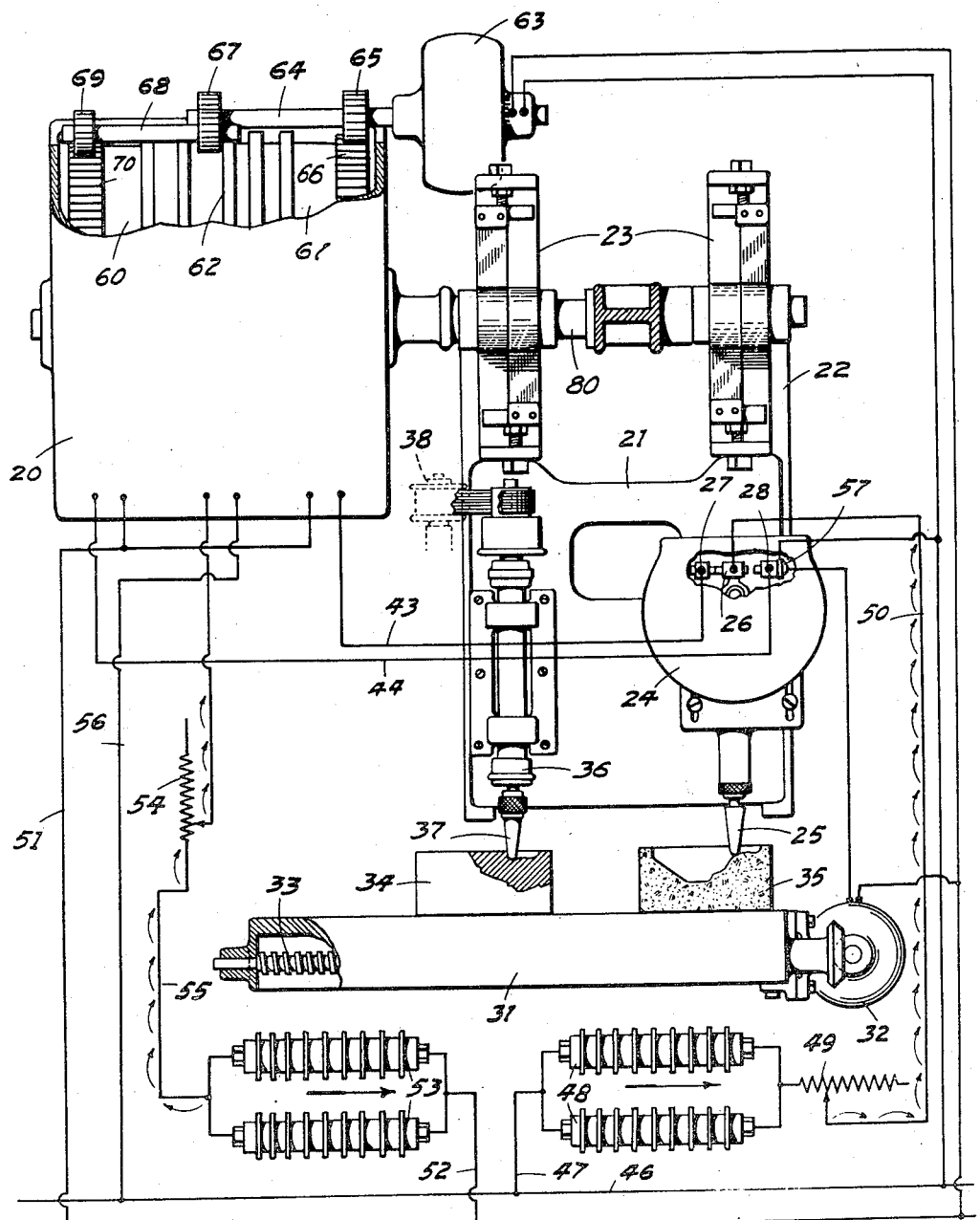
Figure 1 is a diagrammatic plan view of a tracer controlled machine tool showing the principal operating features of apparatus with which the improved clutch and brake mechanism of the present invention is especially adapted to cooperate.
Figure 15:
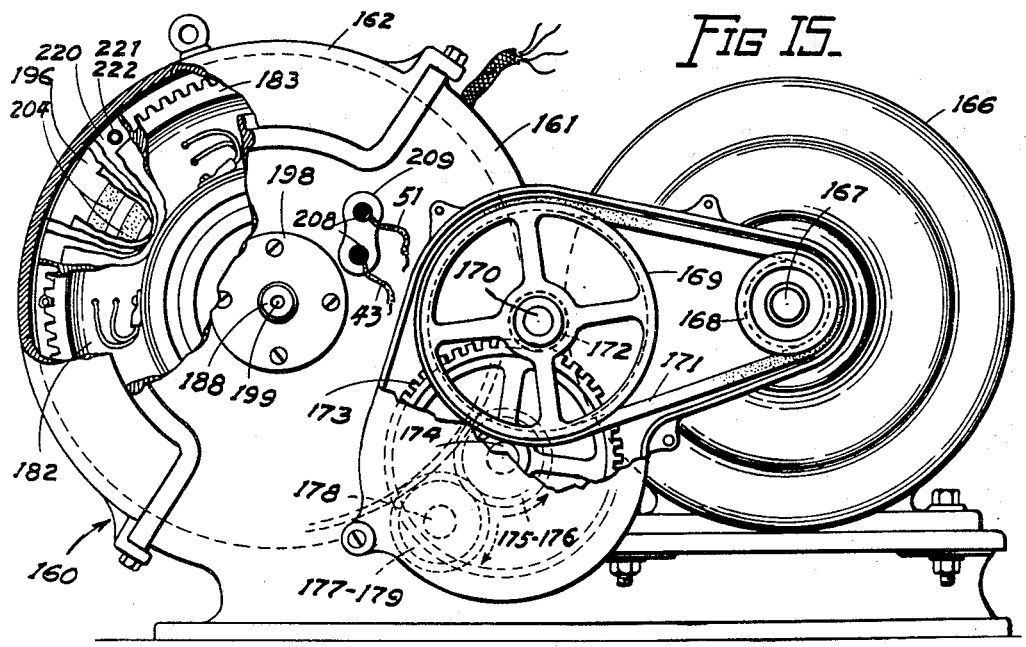
Fig. 15 is a view in end elevation of a complete clutch and brake driving mechanism for forward and reverse operation, shown associated with a driving motor and inter-connecting reverse gearing.

Fig. 17 is a view in side elevation of the clutch and brake unit shown in Fig. 7, illustrating another method of opening the housing to provide access to the friction surfaces, and Fig. 18 is a diagrammatic view partly in vertical section of a hydraulically actuated clutch and brake mechanism constituting a modified form of the invention and having operating characteristics similar to those of the electromagnetic type.

Figs. 19, 20 are modifications of the structure of Fig. 6.

To facilitate the description of clutch and brake mechanism embodying the present invention, a practical installation of an illustration mechanism is shown in the drawing in association with a tracing machine corresponding generally to the machine disclosed in my previously mentioned co-pending application, Serial No. 723,105.

As shown in Fig. 1 of the drawing, the tracing machine comprises a tracer and tool carriage 21 that is slidably mounted for forward and backward movement on two rails 23 formed integrally with the base 22. A tracer mechanism 24 and a rotatable, tool carrying spindle 36 are mounted on the said carriage 21 for unitary movement therewith. The tool spindle 36 is driven by means of a series of belt driven pulleys 38, the latter being motivated by a suitable source of power (not shown). A cutter 37 mounted in the tool spindle 36 and a tracer tool 25 mounted on the tracer mechanism are disposed to operate upon a work piece 34 and pattern 35 respectively. The work piece 34 and the pattern 35 are clamped to a work table 31 which is vertically disposed to the tool spindle 36 and tracer tool 25. The table 31 is driven to effect transverse feeding movement at a predetermined rate of speed by means of a table screw 33 actuated by a motor 32 mounted in the usual manner.

A clutch and brake mechanism 20 affords a practically instantaneous means for imparting controlled motion to the tracer and tool carriage 21 and consists of two magnetic clutch elements 60 and 61 and a magnetic brake element 62. Each clutch element is rotated oppositely from the other by means of a continuously operating motor 63. Each of the elements may be rendered operative by the excitation of magnetic coils therein. Since precision control is essential for accurate tracing operations, a cyclic current is used wherein the brake element 62 receives the current during one half of each cycle and the clutch elements 60 and 61 receive the current during the other half of each cycle as more fully explained in the previously mentioned co-pending applications.

This cyclic operation is electrically accomplished in the following manner. Sixty cycle current is taken from two main feeder lines 45 and 46. In the case of the clutch elements 60 and 61, current is taken from feeder line 46 and fed through a line 47 to a series of copper oxide rectifiers 48 where only the specified half cycle clutch current is permitted to pass on to a variable resistance 49. Thereafter the current passes along the line 50 to a movable contact 26 of the tracer mechanism 24. Since this contact 26 is pivoted and connected with the tracer tool 25, it reacts to any pressure placed on the tool. Thus a reduction in pressure beyond a given standard on the tracer tool 25 will result in the contact 26 shifting over to engage a stationary contact 27 which in turn is connected to the clutch element 61 by means of a conductor 43. Energization of the clutch element 61 results in an inward movement of the tracer tool 25 and cutter 37 toward the pattern 35 and workpiece 34. An increase in pressure on the tracer tool 25 will result in moving the contact 26 into engagement with a stationary contact 28 thereby completing a circuit through the conductor 44 to the clutch element 60. Energization of the clutch element 60 effects an outward movement of the aforementioned tracer tool 25 and cutter 37. The circuits of both clutch elements are completed through a return line 51 to the feeder line 45.

To provide energizing current for the brake element 62, another series of copper oxide rectifiers 53 are connected to the feeder line 45 through a line 52 the arrangement being such that the opposite half of the current cycle is utilized. Half cycle brake current is permitted to flow from the rectifiers 53 to the brake element 62 through the line 55 in which a variable resistance 54 is connected. The brake circuit is completed through a return line 56 which extends from the element 62 to the feeder line 46. The variable resistances 49 and 54 enable the operator to adjust the amount of current flowing to the clutches and brake under variable operating conditions.

From the foregoing description of the electrical circuits leading to the clutches and brake, it will be apparent that energizing half cycles of current flow to the clutches and brake alternately, the brake being energized intermittently and the clutches energized alternatively and intermittently under the control of the tracer mechanism.

The driving motors 32 and 63 for the clutch-brake mechanism 20 and for the work table 31 likewise receive their power from the feeder lines 45 and 46. A safety switch 57 inserted in the table feed motor circuit and operable in conjunction with the tracer mechanism 24 opens the circuit and temporarily stops the table feed whenever an excessive rise in the pattern surface occurs in which the cutter 37 and tracer tool 25 are unable to respond rapidly enough under the operating table feed.

An electromagnetic clutch-brake mechanism as originally disclosed in my co-pending application Serial No. 723,105, generally consists of two electromagnetic clutch elements 60 and 61 each rotated oppositely from the other, and an electromagnetic brake element 62 fixedly attached to a frame 71. The elements are electromagnetically operated, and the clutch elements 60 and 61 are excited only when the respective tracer control contacts 27 and 28 are engaged by the movable contact 26. Thus a change in the direction of travel of the tracer point 25 will cause a corresponding movement of the tracer and tool carriage 21 together with the cutting tool 36, either toward or away from the workpiece 34 and pattern 35.

The clutch or driving elements 60 and 61 are constantly rotated, one oppositely from the other, by the motor 63 as previously mentioned. For this purpose, the motor shaft 64 has a gear 65 fixed thereon which meshes with the large gear 66 encircling the periphery of the clutch element 61. The shaft 64 also extends into a transmission 67 wherein the direction of rotation of a secondary driving shaft 68 is reversed from that of the motor shaft 64. The secondary driving shaft 68 is provided with a gear 69 that drives the clutch element 60 at the same speed as the clutch element 61 though in the opposite direction, through engagement with a large gear 70 encircling the outer periphery of the element 60.

A modified means for driving the clutch elements in opposite direction is shown in Fig. 7. In this construction, two stub shafts 74 fixedly attached to the gears 65 and 69 respectively, extend outwardly on each end of the clutch brake mechanism 20. A pulley 75 is keyed to each of the shafts 74. An extended motor shaft carrying two driving pulleys (not shown), both of which are connected by a belt to the aforementioned pulleys 75 respectively, affords a driving means for each of the clutch elements. By arranging one of the belts 76 to run crossed, one clutch element will be rotated oppositely from the other.

A clutch or armature shaft 80 extends from the tracer tool carriage 21 into the clutch-brake mechanism 20. An armature carriage or transmitter 81 is splined to the shaft 80 and, with three clutch discs or tracing armatures 82, 83 and 84 slidably mounted thereon constitutes the driven element. The clutch element 61 is rotatably mounted on the right side of the carriage 81 on the armature shaft 80, whereas the clutch element 60 is rotatably mounted on the left side of the armature carriage 81 on a stub shaft 85 fixedly mounted in the hub 86 of the cover 87. The inner end 88 of the shaft 85 is provided with a cone shaped socket to receive and bearing the pointed end 89 of the armature shaft 80. This provides for readily removing the clutch element 61 to permit access to the mechanism for purposes of cleaning and repairs.

Since the construction of the clutch elements 60 and 61 are exactly alike, only one element will be described in detail. As seen in Figs. 2, 3 and 6, a clutch element consists of a clutch body 95, wherein the electromagnetic means are mounted. A circular flange 96 having an angular cross section is attached to the back side of the said body. Threads 97 afford the means of adjustably mounting the large gear 66 on the mounting ring 99. A portion 98 of the circular apron 101 on the circular flange 96 is also threaded to threadably receive the extending apron 100 of the mounting ring 99 and securely anchor these parts when they have been locked in position with bolts 102 extending into equally spaced bosses on the clutch body 95.

Horseshoe electromagnets 104 are mounted in the clutch body 95 on the mounting ring 99 which must be so adjusted that the poles 105 of the electromagnets 104 extend to within .005" of the friction surface 106. While it is desired to make use of the maximum magnetic flux originating at the poles 105, actual frictional contact is never desired. Adjustment of this spacing is accomplished by loosening the bolts 102 and rotatably changing the position of the large gear 66 with respect to the circular flange 96 until the desired distance is obtained. The horseshoe ends 107 of the electromagnets 104 are retainably clamped against the circular ridge 103 of the mounting ring 99 by means of recessed blocks 108 and bolts 109 fastened thereto. The mounting ring 99, the recessed blocks 108, and the bolts 109 are made of materials having non-magnetic qualities so that the action of the electromagnets 104 is not affected. The two poles 105 of each horseshoe electromagnet 104 extend horizontally through enlarged holes 110 in the clutch body 95 to the frictional surface 106. Tubes 111 made of an insulating material are fitted into the enlarged holes 110. Each pole 105 of the magnet 104 is retained in position by means of an adjustable screw clamp 112 fastened on the inner side of the body 95.

Insulating spools 113 fitted onto the poles 105 of each horseshoe electromagnet 104 between the outer face of the clutch body 95 and the mounting ring 99 carry wire coils 114. When these coils are charged with an electric current, an effective magnetic flux is developed at the ends of the poles 105.

The electrical connections for the clutch elements are made on a heavy disc 115 of insulating material mounted on a circular ridge 116 at its outer diameter and on the edge of the hub (not shown) of the clutch body at its inner diameter. A pair of terminals 117 and 118 near the outer periphery of the insulated disc 115 are provided for supplying the actuating current to each wire coil 114. Permanent connections on the enclosed side of the insulated disc extend from each of the said pairs of terminals 117 and 118 to one of two collector rings located near the inner periphery of the said disc, as generally shown in Fig. 11. A set of brushes riding on the collector rings and retained in position by a brush holder are the means of supplying current from the respective tracer contact 27 or 28 and from one side of the line 46 to the revolving clutch elements 60 or 61. Thus a closure of one of the tracer contacts will actuate the respective clutch member controlled thereby. Should future demands necessitate a coil capable of creating a greater magnetic flux, it would merely be necessary to change the wire coils 114 for others having the desired specifications without any detailed structural alterations.

A vibrator ring 125 with an L-shaped cross section is fitted to a seat 126 on the outer periphery of the clutch body 95 and retained in position with bolts 127 extending into the clutch body 95. An outer armature disc or gripping armature 128 is movably suspended in parallel relation with the friction surface 106 on the inner side of the clutch body 95 on a series of equally spaced pins 129.

A series of magnetic vibratory levers or disc engaging means 130, one for each of the magnetic poles 105 exposed on the friction surface 106 of a clutch or brake body, are mounted for individual adjustment on the vibrator ring 125 by means of a hinge mechanism. This mechanism consists of a hinge portion 132 to which the vibratory levers are fixedly attached, and a holder 131 hinged to the said hinge portion 132. The hinge portion 132 and holder 131 are both made of a non-magnetic material in order to minimize the distortion of the effective magnetic field without decreasing the effectiveness of the clamping action upon the tracing armatures. The holder 131 is fastened to the vibrator ring 125 by means of a cap screw 133 extending inwardly through the said ring. An adjustment can be made by loosening the cap screw 133 and turning the holder 131 until the heel of the vibrator lever 130 rests against the backside of the gripping armature 128. A spring 134 anchored on the holder 131 pressurably retains the lever 130 in contact with the said armature without placing sufficient pressure thereon to clampingly engage the tracing armature.

The brake element 62 (see Fig. 6) is a centrally located stationary element and the frame 71 thereof is fastened on a circular ridge 73 in the casing 72 covering the adjoining clutch element 61. The brake plate 140 is an integral part of the frame 71, and carries a set of horseshoe electromagnets 104, coils 114, vibrator ring 125, gripping armature 84 and vibratory levers 130 in the same manner as the clutch elements 60 and 61 except that the brake element 62 does not revolve and therefore does not carry the large gear. The mounting ring 99, upon which the electromagnets 104 are anchored is adjustably retained in position through threaded contact with the frame 71 and bolted into position. The armature carriage 81 locked on the armature shaft 80 consists of a comparatively wide gear surface 145 upon which the three tracing armatures 82, 83 and 84 are mounted. A tracing armature assembly consists of an internal ring gear 146 having a step seat 148 into which an armature disc 147 is mounted and permanently retained with a locking ring 149 and screws or rivets as seen in Fig. 6. The teeth of the internal ring gear 146 of each tracing armature are fitted on the gear toothed surface 145 of the armature carriage 81, both of said gears of necessity being perfectly machined to eliminate lost motion. Yet the said units are slidably free for endwise movement and permit full contact of the tracing armature with the frictional surfaces 106 and the gripping armatures 128 of the clutch and brake elements. Each of the three tracing armatures are identical in construction except for certain grooves cut into the face of the armature discs 147. The clutch armature discs 150 (see Fig. 4) have a shallow spiral groove 151 cut into that side of the disc which lies adjacent to the frictional surface 106 on the clutch elements 60 and 61. The outward spiral direction of the groove 151 is opposite the direction of rotation of the clutch element in which it is used in order to drive the dust and grime collected in the groove outwardly until it drops out of the said groove 151. The brake armature disc 152 contains numerous radial grooves 153 extending outwardly toward its periphery, as shown in Fig. 5, which lie adjacent to the frictional surface 106 of the brake element 62 and which tend to keep the said surface clean and increase the braking ability of the element.

For purposes of inspection, cleaning and repair, the clutch-brake mechanism 20 was designed and constructed to facilitate accessibility. A clutch casing 72 fastened on a base support (not shown) encloses one clutch element 61. A circular ridge 73 (see Fig. 6) or an overlapping flange 155 (see Figs. 7 and 17) on the exposed periphery of this casing aligns and supports the frame 71 containing the brake element 62. Screws 154, as shown in Fig. 17, extending through the casing 72 and frame 71 may be used to lock the two together. To gain access to either the clutch element 61 or brake element 62 screws 154 must be removed and the entire brake mechanism 62 slid endwise off the armature carrier 81. The other clutch cover 87, containing the rotatably mounted clutch element 60, is aligned with and fitted to the brake frame 71 by means of a receptive groove 90 in each unit, and fastened thereto by means of a hinge 91 and a latching device 92 oppositely placed therefrom (see Figs. 7 and 17). Since the tracing armature 82 is retained with the clutch element 60, the inner ring gear 146 thereof must be realigned with the gear toothed surface 145 of the carrier 81 when the cover 87 is closed. Oil and grease on the armature shaft 80 is prevented from spreading onto the internal mechanisms by a curved flange 119 which is integrally formed on the clutch body 95 of each clutch element 60 and 61 and which extend inwardly beneath the two ends of the armature carrier 81.

The operation of this electromagnetic clutch-brake element will now be more apparent. The cyclic current to the brake element is flowing to that element continuously, so if a 60 cycle current is used, this element will function every sixtieth of a second and its period of operation will be for one half of that time. During this functioning period, the electromagnets 104 will be excited by the current flowing through the wire coils 114 and a magnetic flux emitting from the poles 105 will create a flux path through the tracing armature 84 and the gripping armature 128. Since the latter armature is slidably connected with the brake plate 140, its function, when magnetically attracted, is to grip the tracing armature 84 and thereby impart a braking action to the armature carrier 81, shaft 80 and the tracer and tool carriage 21 to which it is connected. Since the function of the clutch elements 60 and 61 is to impart a driving force, their actuation is dependent upon the contact closure in the tracer mechanism 24 and the tracer tool 25. Thus the cyclic current flows to the one or the other of the clutch elements depending upon the action of the tracer tool 25 as it passes over the pattern 35. While a pair of tracer contacts are closed the clutch element functions every sixtieth of a second for a period of one one-hundred and twentieth of a second, but these periods of operation are interposed between the periods of operation of the brake element 62. During the functioning period of one of the clutch elements 60 or 61, the horseshoe electromagnets 104 contained therein are excited and a magnetic flux path is circulated from the poles 105 through the tracing armature 82 or 83 depending upon which clutch element is being excited, and the gripping armature 128. Here again this action causes the tracing armature to be clamped between the clutch body 95 and the gripping armature 128, and, since the clutch elements 60 and 61 are constantly rotated oppositely from each other, a rotative motion is imparted to the tracing armature, armature carrier and shaft, and to the tracer and tool carriage 21.

Thus instead of a constant forward or backward motion being imparted to the tracer and tool carriage 21 and tracer tool 25, a rapid series of driving and braking actions, (in this instance sixty times per second) are created. This intermittent action enables a more accurate reproduction of a given pattern than has been previously attained.

A modified form of electromagnetic clutch-brake mechanism, as generally disclosed in the Lochman application Serial No. 257,216, filed on February 18, 1939, is exemplified in Figs. 8 to 16 inclusive of this application.

In this instance the entire clutch-brake mechanism 160 is contained in a circular casing 161 with a detachable cover 162. The hubs 163 at each end of the casing support elongated bearings 164 which are fixedly mounted therein and upon which the respective clutch elements 180 and 182 are rotatably supported with anti-friction bearings 165 and rotated at a reduced speed by means of a driving motor 166. The motor (see Fig. 15) is adjustably mounted adjacent to the clutch-brake mechanism 160. A motor shaft 167 contained in the said motor has a pulley 168 keyed to one end. The mating pulley 169 is of a larger diameter and is connectably mounted on a stub shaft 170 journalled in an extending portion of the casing 161. A multiple series of V belts 171 mounted in corresponding receptive grooves in each of the pulleys 168 and 169, affords a connecting means between the motor 166 and the element 160. A gear 172 rotatably connected with the pulley 169 on the stub shaft 170, meshes with and drives a gear 173 fixedly mounted on a journalled shaft 174 disposed parallel with the clutch elements 180 and 182 on the exterior of the casing 161. Spur gear 175 keyed to the shaft 174 meshes with and drives the large gear 183 integrally formed on the outer periphery of the clutch element 182. A transmission gear 176 splined on the shaft 174 constitutes one gear of a two-gear reversal transmission in which the second transmission gear 177 is splined to a shaft 178 parallelly disposed to the shaft 174. The shaft 178 carries a spur gear 179 which meshes with and drives the large gear 181 integrally formed on the outer periphery of the other clutch element 180. Thus the two clutch elements 180 and 182 are rotating at the same speed but oppositely from each other.

An armature carrier or splined hub 185 supporting three armatures, a brake element and two outer armature assemblies, placed in the casing 161 between the clutch elements 180 and 182 and retained in endwise position by two washers 197 mounted on the inner end faces of each of the clutch elements, constitutes a driven element. The washers 197 also serve to prevent the escape of oil and grease onto the frictional surfaces 196 of the elements, and, since the said washers extend slightly beyond the frictional surfaces 196 of the clutch elements, they also prevent any damage to the treated frictional surfaces as the carrier 185 is being installed or removed. When properly positioned, the splined bore 186 of the armature carrier 185 will be in axial alignment with the bores 187 of the elongated bearing sleeves 164 supporting the clutch elements and it is then possible to insert a control shaft 188 in the hub 163 on the right side of the casing 161. The mid section 189 of the control shaft 188 is splined to receive the armature carrier 185. The end portions of the shaft are received in the elongated bearings 164 in the hubs 163 of the casing 161.

A splined portion 190 on the extreme left end of the shaft 188 (see Fig. 10) extends into an internal spline of a bevel gear 191 which is rotatably mounted in the hub 163. The gear 191 constitutes the means of transmitting controlled rotation to a secondary mechanism (not shown) such as the work table of a machine tool. The shaft 193 has a mating gear 192 retained thereon which meshes with the gear 191; the shaft 193 and gear 192 being revolvably clamped on the left side of the casing 161 by means of a double-armed bracket 194. The shaft 193 is rigidly journalled in the bracket 194. An inwardly-extending circular flange on the bracket 194, when positioned, is clamped between a locking ring 195, which is fastened to the casing 161, and the hub 163 on the casing 161. Thus the shaft 193, gear 192, and the bracket 194 may be angularly positioned, in relation to the control shaft 188, within a range of 360° as indicated by the arrow adjacent to the said shaft in Fig. 11.

The control shaft 188 is locked in position with a locking plate 198 located on the right hub 163 of the casing 161 whereas the shaft 188 may be removed by fastening a screw jack (not shown) into the threaded hole 199 provided in the right end of the shaft and applying pressure in the usual manner.

Both of the clutch elements 180 and 182 and the brake element 184 are exactly alike in construction. A disclike carrier of large diameter known as a clutch body 200 or brake body 201 constitutes the supporting structure in each clutch or brake element. Each clutch and brake body contains two annular slots 202 (see Figs. 10 and 13) in one of its end faces 203 into which windings 204 of annular form are inserted and locked into position with molten type metal or other suitable non-magnetic material. This metal, when hardened, forms a protective surface over the windings and extends into the triangular grooves 205 at the outside edges of each slot 202.

Figure 16:
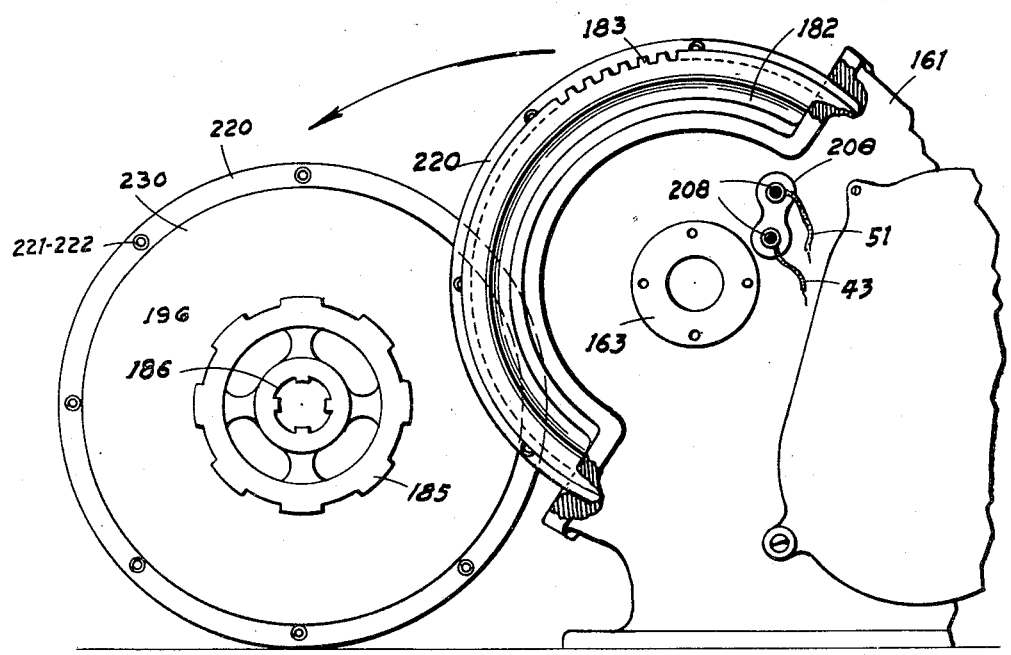
Fig. 16 is a view similar to part of Fig. 15 showing the clutch and brake mechanism with the casing open and parts removed to facilitate cleaning and adjustment.

The windings 204, when electrically charged, create a magnetic field throughout the adjoining parts. In the case of the two revolving clutch elements 180 and 182, the electrical connections to these windings are made through slip rings 206 on the outer end face of each element. These slip rings 206 are mounted on an insulated block 207 and are directly connected to the two windings 204. Two brushes 208 slidably retained in a brush holder 209 mounted in the side of the casing 161 adjacent each of the clutch elements, maintain constant contact with the two revolving slip rings 206. The brushes 208 are connected to the stationary tracer contacts 27 and 28 and to the return line 51 to form a completed circuit. Since the brake element 184 remains stationary, the electrical connections to the windings 204 are made in the following manner. The cyclic current for the brake is conveyed by the two wires 55 and 56 which are connected to the one side of a plug 210 conveniently mounted in the casing 161 (see Figs. 10 and 11). Two wires 55 and 56 continue from the other side of the plug 210 through a hole 211 in the brake body 201 to a recess 212 in the back endface thereof, where connections are made with the lead wires of the windings 204 which extend into the same recess 212. The said plug serves to facilitate the removal of the driven members as indicated in Fig. 16.

Because the brake element serves to effect a braking action on the armature carrier, the outer periphery of the element 184 is machined to fit a centrally machined portion 245 in the casing and clamped at two points in said casing 161 to prevent rotation. This is accomplished by means of a pin 216 anchored in the recessed portion 217 on the brake element, upon which a clamping plate 218 is set and locked with a bolt as shown in Fig. 12. For servicing any of the frictional surfaces it is necessary to remove the clamping plates 218 and axially displace the brake element 184 by sliding it endwise in this centrally machined portion 245 (See Fig. 10).

An outer armature 220 is carried by each clutch and brake body for joint action therewith, by means of a series of springs 221 attached to the outer periphery of the outer armature and enclosed in projecting tubes 222. The said armature lies in a spaced relation with such a body and is yieldable for axial movement to and from the body. It yieldably retains the armature 230 in operatively close proximity to the magnet. The spring mechanisms 221 extend through holes or slots 223 in a projecting rim 224 on the circumference of the body. The spring mechanisms are permanently fastened to the outer armature or retainer to facilitate the assembly thereof with a minimum loss of time or parts. Each spring, when positioned, is hooked to a peg 225 set in a recessed portion 217 of the body. Radial movement of the outer armature 220 with respect to the clutch or brake body to which it is thus attached is thereby prevented (see Figs. 10, 13 and 14).

The three armatures or clutch discs of an electromagnetic material, in this clutch-brake mechanism, are also identical in construction. An armature consists of a double-faced disc, one large face 230 (Figs. 10, 11, 16) to lie adjacent to and meet with the frictional surface 196 on the clutch or brake body while the smaller face 232 is parallel to and engaged by the outer armature 220 attached to the said body. The clamping action upon the armature 230 is accomplished by means of the excitation of the electrical windings 204 in the said bodies at a rate approximating sixty cycles per second and the resultant intermittent magnetic flux acting upon the corresponding armature and outer armature. Thus a driving or braking motion is imparted to the armature 230 during the fraction of a second in which the clamping action is effective. A hub 233 integrally formed on one side of said armature is placed adjacent to the outer armature 220. Splines machined on the inner bore of the armature 230 and hub 233 permit a sliding endwise engagement with the splined surface of the armature carrier 185, upon which it is mounted, with a minimum of backlash.

An improved frictional surfacing material 235 has been developed to provide an extremely small gap between the magnetic surfaces of the armature 230, the surfaces of the clutch or brake body and the outer armature 220.

The material must be durable under the most extreme clutching conditions. Such a surfacing material is obtained by applying a layer of cement 236 on the body surface and the outer armature surface of each of the clutch and brake elements, placing a layer of coarsely woven linen 237 thereon and thereafter brushing or spraying the linen with a solution 238 of powdered aluminum and a quick drying flux. An enlarged view (Fig. 8) exemplifies the extent of the penetration of the solution into the linen. Any irregularities upon the frictional surfacing material 235 immediately after the application of the solution 238 will be eliminated within a few minutes after the element is placed in operation and a smooth frictional surface will result. The aluminum solution may be applied whenever any appreciable wear occurs thereon without completely dismantling the elements. Thus the machine need not be out of service for long periods of time as would be required if the usual interchangeable type of facing were used. Sufficient space exists between the clutch and brake elements to permit easy accessibility to each of the frictional surfaces by effecting an axial endwise movement of the various parts.

As above explained, this servicing operation involves the removal of the brake clamping plates 218 (Fig. 12) and the axial displacement of the brake element 184 by sliding it endwise in the centrally disposed and somewhat elevated portion 245 of the casing which is machined to fit the flanges of brake element 184. With the brake element displaced as shown in Fig. 10, and the appropriate armature 230 and supplemental armature plate 220 disconnected as shown in Fig. 10, ample clearance is provided for the reservicing of the clutch facing. The length of the splined hub or armature mounting member 185 is intentionally made adequate to permit of the displacement of the parts as above described for servicing.

The design of the brake-clutch mechanism is such that for purposes of repairs each of the elements is readily accessible. To make any repairs it is only necessary to open the cover 162 remove the control shaft 188 by applying pressure with a jack attached to the right end thereof, unhook the outer armature 220 from each of the clutch elements 180 and 182 withdraw the armature carrier 185 with the brake element 182 outer clutch armatures 220 and the three armatures 230 splined thereon, as indicated by the arrow in Fig. 16, and finally slidably remove each of the clutch elements from the elongated hub bearings 164 in the casing 161. This procedure involves a mere matter of minutes to execute and thereafter repairs or adjustments may be made on the various units without the confines of the casing with a minimum of effort. For purposes of assembly the exact reverse procedure is followed.

The pocket provided by the semi-cylindrical and somewhat raised casing portion 245 to which the brake element 184 is normally anchored and to which it is fitted as shown in Fig. 11, is shallow, since the seating surface 245 terminates in a plane which is approximately 60 degrees to the vertical. This facilitates the rolling into and out of the casing as a unit of the assembly comprising brake element 184, outer clutch armatures 220, and armatures 230 as shown in Fig. 16. When this unit is rolled back into the casing the peripheral flanges of the brake element and the peripheral surfaces of the several armature elements are centered by engagement with the raised central portion 245 of the casing, whereby the armature carrier is positioned to receive shaft 188 when the shaft is re-inserted.

The same raised central portion 245 of the casing facilitates the removal and replacement of the clutch elements since the rims 224 on the respective clutch elements receive support from the raised bearing portion 245 of the casing as soon as the clutch elements are slid axially toward the center of the casing from their mounting sleeves 164 preliminary to the removal of the clutch elements from the casing. Similarly, when the clutch elements are re-introduced into the casing their flanges 224 support them from the bearing surface 245 in axial alignment with the bearing sleeves, thereby facilitating the re-mounting of the respective elements upon the respective sleeves.

A modification in the construction of the casing 240 and cover 241 is shown in Fig. 11, in which the back side of the casing is kept clear for mounting purposes. The driving motor and transmission assembly (not shown) is mounted below the clutch-brake mechanism and drives the clutch elements 180 and 182 in opposite directions through geared connections with the large gears 181 and 183 on the outer periphery of the elements in the same manner as previously described. The cover 241 is hinged on a pin 242 and can be tipped until it rests against the casing abutment 244 as indicated by the arrow 243. The clutch and brake elements are inserted, mounted or removed in the same manner as aforementioned.

A hydraulic version of the clutch and brake mechanism is shown in Fig. 18. This mechanism functions similarly to the electromagnetic apparatus and includes a unit 250 that is mounted on a base 251. The unit 250 has three upright brackets 252, 253 and 254 containing sleeve bearings 255, 256 and 257 in axial alignment for the reception of a control shaft 260. Centrally located between the brackets 253 and 254 a double faced clutch disc 261 is keyed to the said shaft to effect driving motion thereto; between the brackets 252 and 253, a brake disc 262 is keyed to the shaft to effect a braking action thereon. The clutch disc 261 is suitably lined on both faces whereas the brake disc 262 has only one face lined. A take-off gear 263 fixedly attached to the end of the shaft affords a connecting means. The control shaft 260, clutch disc 261, brake disc 262 and take-off gear 263 constitute the driven member.

The driving means comprised two clutch plates 264 and 265, rotatably mounted on the sleeve bearings 256 and 257. The said plates are parallelly disposed on each side of the clutch disc 261. The right bracket 254 and the middle bracket 253 each have a circular flange 266 integrally formed thereon containing a machined outer surface. An extending flange 267 formed on each clutch plate has an inner surface machined for rotatable operation on the machined surface of the circular flange 266. A circular recess in the clutch plate and beneath the circular flange constitutes a hydraulic actuating chamber 268 by which the clutch plate is forced into contact with the clutch disc 261.

Large gears 270 and 271 are integrally formed on the outer peripheries of the clutch plates 264 and 265 and afford the means whereby these plates are rotated oppositely from each other at a comparatively slow rate of speed. A driving motor 272 with an extending shaft 273 properly bearinged in the bracket 254 has a driving gear 274 fixed thereto which meshes with the large gear 270 on the clutch plate 264. The same gear also meshes with another driving gear 275 journalled on a stub shaft 276 mounted in the bracket 253, and causes the latter gear to drive the large gear 271 and clutch plate 265 oppositely from the first mentioned clutch plate 264. The clutch plates are thus rotated continuously during the operation of the mechanism.

The brake mechanism is mounted between the left bracket 252 and the middle bracket 253. A circular flange 281 with an L-shaped cross section formed integrally with the bracket 252 forms a circular recess between the flange 281 and the projecting sleeve bearing 255. The bracket plate 283 is slidably mounted on the sleeve bearing 255 while a projecting flange 284 formed integrally with the said plate is machined to fit within the circular recess and form a hydraulic chamber 282 whereby it is possible to force the brake plate hydraulically against the brake disc and impart a braking action to the disc 262. Pins 285 mounted in the brake plate 283 extend into mating over-size holes in the circular flange and prevent the plate from rotating. Oil leakage is prevented from the bearing 255 in the bracket 252 by means of a sealing plate 286 and from the bearing 257 in the right bracket 254 by means of an adjustable packing flange 287.

A cyclic action approximating sixty pulsations per second between the clutch and brake is obtained in this mechanism by means of a double-faced, cam-actuated hydraulic piston 291 in a cyclic pump 290. Both ends of a hydraulic cylinder 292 containing the piston 291 are sealed. A cam shaft 293 extending across the middle of the cylinder, is suitably journalled in protruding hubs 294 on each side of the cylinder. The cam shaft 293 is driven at a speed approximating 3600 R. P. M. by means of a pair of gears 295 and a motor 296. A bearing 298 mounted on an eccentric 297 contained on the said shaft rides the surfaces of a vertical slot 299 in the piston 291. Thus a reciprocating movement is imparted to the piston.

The cyclic motivation is hydraulically imparted to the brake and clutch plates by connecting one piston chamber in the cyclic pump 290 to the hydraulic chamber 282 behind the brake plate 283 and by connecting the other piston chamber in the pump to the hydraulic actuating chambers 268 adjacent the clutch plates 264 and 265. A control valve 305 is inserted in this line to provide for actuating only one clutch plate at any one time. To compensate for oil leakage in the chambers or lines, an auxiliary oil pump 300 is used. This pump is of a standard gear type and is driven from the driving gear 275 by means of the gear 301. The oil is pumped from a sump 302 to both ends of the cylinder 292 in the cyclic pump 290 under a constant pressure, through an oil line 303. A check valve 304 in the lines prevent a back pressure to the auxiliary oil pump 300.

The control valve 305 affords a means of adapting a hydraulic clutch-brake mechanism 250 as herein exemplified, to a tracing machine. The valve casing 306 contains three outlets which are connected to three lines, namely the line 307 from the clutch actuating side of the cyclic pump 291 and the two lines 308 and 309 leading to each of the clutch plates 264 and 265. A rotatable center portion 310 of the valve contains a passage 311 whereby the hydraulic fluid is diverted from the cyclic pump line 307 to either of the clutch lines 308 or 309. This passage must be positioned at all times to permit the fluid to reach one or the other of the clutch elements and permit the impartation of a driving motion to the shaft 260. A gear 312 is attached to one end of the rotatable portion 310, with a gear rack 313 on one end of a solenoid plunger 314 meshing therewith. Two solenoid elements 315 and 316 electrically connected to the tracer contacts afford a means of moving the plunger in a desired direction to effect the predetermined angular displacement of the said central portion of the valve, and thereby control the direction of rotation of the driven element. The electrical circuit diagram for the tracing machine may be the same as shown in Fig. 1, with one line 43 extending from the stationary tracer contact 27 to solenoid element 315, and another line 44 extending from the stationary tracer contact 28 to solenoid element 316. The return line 51 for completing the circuit would also be connected to each of the solenoid elements 315 and 316.

Thus it is possible to operate a hydraulic clutch-brake mechanism, as herein described, in a manner of operation identical with that of the electro-magnetic clutch-brake mechanism. A cyclic action approximating sixty cycles per second is obtained between the clutch and brake to impart a corresponding driving and braking action to the driven element.

While only one application of a clutch-brake mechanism has been described in detail, namely as applied to a tracing machine, it is evident that other applications are possible, and that this same mechanism, while described as operative at a rate approximating sixty cycles per second, may also be operated at other rates of oscillation. It is to be understood that modifications in general design and details may be made without departing from the spirit of the invention within the scope of the subjoined claims.

The structure of Figs. 19, 20 presents a modification of the structure of Fig. 6, particularly as to the operating mechanism of the brake. The brake friction disc 200 is fixed for rotation with a driven member 201 common to the friction discs of the clutches. A plurality of stationary electro-magnets such as 202 are carried on the housing along with a fixed friction plate 203 having a facing 203a adapted for engagement with one face of the brake friction disc. Levers such as 204 are pivoted at 204a and carry pivoted friction shoes 204b and a facing 204c which may be in the form of an annular ring. The magnet coils are provided with axially movable cores or armatures such as 205 which are strongly urged to the right in Fig. 19 whenever the magnet is energized, whereby the levers 204 are moved by pins such as 205a in a direction to effect pressure engagement of the brake friction surfaces. A relatively slight pressure contact between the surfaces is continuously maintained by spring plungers such as 206 and springs 207.

Summary of structure, purposes and operation:

The general purpose of the invention is to provide a power operable drive and brake mechanism for effecting maximum accuracy of controlled movement and of controlled positioning of a driven mechanism and generally to improve the construction and operation of such mechanism. The semi-diagrammatic tracing machine of Fig. 1 is illustrative of a driven mechanism where such accuracy is necessary. In such a machine, for example, maximum accuracy in reproducing the form of the pattern 35 on the work piece 34 requires a minimum of over-all lag or response-time for starting, stopping or reversing the support or slide 21 which carries the tracer 25 and tool 37. The slide should instantly follow the control of the tracer device, and to this end the control clutch mechanism is required to instantly interpret and transmit to the slide the movement of the tracer stylus, as reflected in the positioning of the control contacts 26, 27, 28.

Figs. 2, 3, 4, 5, 6, 19, 20 of the drawings disclose clutch structure substantially the same as is shown in said copending application Serial No. 723,105. Figs. 10, 11, 12, 13, 14 of the drawings disclose clutch structure substantially the same as is shown in said copending application Serial No. 257,216. Each of the co-pending applications mentioned is directed to tracer controlled mechanism of the general type shown in Fig. 1, and each of the clutch mechanisms herein respectively derived therefrom as stated have various common features of invention directed toward the mentioned general purposes of this invention, namely, improved accuracy of the controlled movement and positioning of a driven mechanism. However, each of said copending applications utilizes electric operated clutch-brake devices to effect the driving, whereas certain aspects of the improvements are not limited to electric control. For this reason the modified driving mechanism of Fig. 18 has been added herein, wherein an important feature of the invention is effected by hydraulic, instead of electrical, means.

One of the improvements contributing to the general purposes mentioned is to effect continuous rapid vibration of the active clutch or brake parts of the driving and braking mechanism. Among other improved results effected by the vibration is to reduce the delay or lag in control-response such as otherwise might occur through the increased friction resisting movement of parts from a position of rest.

The clutch-brake mechanism of the present disclosure provides several different vibratory effects, as follows:

Referring to Figs. 2, 6, the spring pressed pivoted levers 132, which are shown in Fig. 3 associated both with a driven clutch and with the brake, carry shoes 130 of material, such as soft iron, which carries some of the flux of the associated magnet cores 104 whenever the associated vibrator pressure rings 128 are magnetized for effecting friction pressure on the associated members 147. The springs 134 maintain a continuous relatively slight pressure of the levers on the rings 128 and of the rings on the associated friction members 147, for purposes later mentioned, but the relationship of the parts is such that the periodic magnetizing and demagnetizing of the cores 104 by the interrupted current as has been described, which occurs continuously in the brake magnets, and occurs in the magnets of each of the forward and reverse clutches continuously during the time that the tracer has selected the clutch for driving, effects a periodic pressure vibration of the pivoted levers 132 on plates 128, and of plates 128 on the associated plates 147, whereby the effect occurs on both friction faces of the plates 147.

Referring to the modified structure of Figs. 19, 20 it will be seen that in this instance also the brake is vibrated as described, but the vibrator means is modified. The springs 207 continuously relatively lightly urge the pivoted levers 204 in direction for the friction shoes 204b to set up pressure on the brake ring 200 but the continuous periodic energizing of the magnet coil 202 sets up the periodic vibration as before described.

Further, each of the clutch structures of the modified forms respectively shown in Figs. 6, 10, 18 and 19 provides vibration effects at all times when either of the forward or reverse clutches is activated by the tracer control mechanism.

The rapid periodic energizing of either of the clutches set up a torsional pressure vibration in all the driven parts connected for actuation of the support or slide 21. It is obvious that, as between the interconnected clutch and brake elements there exists a torsional deflection, reversed periodically by the alternate application of the driving and braking effects, previously described. Such reversal of torsion effect is transmitted to the slide 21 as a vibratory force operating alternately in directions to move or stop the slide and depending in part upon the mass of the slide and in part upon the relative adjustment of the current controllers 54, 49, Fig. 1, the result may be such as to effect either continuous vibratory advance movement or alternate start and stop of the slide. Also, by reason of the inertia and friction of the slide, such forces effect a torsional vibration in all of the rotation elements of the train connecting the clutch-brake device to the slide.

It will be noted that in each of the modified clutch-brake devices herein disclosed the opposed friction plates of each of the forward and reverse clutches and of the brake are continuously maintained in friction contact, without clearance. In the devices of Figs. 6, 10, 19 the result is effected by springs, as has been pointed out. In the hydraulic device of Fig. 18 the contact also operates continuously, in part by reason of the auxiliary pump 300, and in part by reason of a certain amount of resiliency in the fluid and its pressure containing walls and channels. Such continuous pressure contact of the parts is important for effecting the minimum of over-all lag and response time, and also is of assistance in rendering effective the vibratory effects, particularly in the driven transmission elements and driven slide 21.

To clutch-brake construction of each of the modifications of Figs. 6, 10 and 18, wherein the clutch or brake friction elements which are connected to the driven portion of the transmission are each located between friction plates which are relatively movable toward one another to effect friction contact on both faces of the intervening element, are particularly effective both for increasing the driving or retarding capacity, as the case may be, and also where the device is to be continuously operated without clearance, in the latter instance because effective continuous contact can be maintained with considerably less pressure per unit of friction surface area.

It will be understood that the tracer machine diagrammatically shown in Fig. 1 is illustrative of a great variety of machines with which the improved clutch-brake device may be associated for operation thereof. For any such machines the clutch-brake control will require selective start, stop and direction control devices, which may be automatically operated, as in the tracer control shown, or may be manually operated by any suitable means, but in either case the clutch mechanism will include a suitable power source for continuously intermittently and periodically applying power to the brake portion, and similarly applying power to either selected clutch portion at intervals between the energizing of the brake, the relative power applied to the brake and clutch portions being proportioned according to the desired effects, by suitable means, as by the regulators 49, 54 of Fig. 1.

I claim:

1. A device of the character described comprising a source of current including means for intermittent interruption thereof and an electromagnetic clutch supplied with said current and comprising electromagnetic means, clutch disks, and levers engaging said disks and having free end portions exposed to the magnetism of said means and spring pressed to vibrate between clutch engaging and disengaging positions subject to the intermittent electromagnetic flux.

2. An electromagnetic clutch comprising driving and driven elements, an electromagnet and a pair of spaced clutch disks carried by one of said elements, an intervening clutch disk carried by the other of said elements, and an armature connected with the element carrying the magnet and including a lever adapted to be attracted by the magnet and having a portion acting upon said disks in a direction to press them together upon the intervening disk when the magnet is energized, the electromagnetism being transmitted to said lever through said intervening disk.

3. An electromagnetic clutch comprising driving and driven elements, one of which has a friction surface, a horseshoe electromagnet having poles projecting near said surface, a tracing armature in operative clutching relation to said friction surface, a gripping armature connected with said magnet, and a pair of vibratory levers mounted for movement with said gripping armature and having their free end portions associated with the poles of said magnet to be attracted thereby through said tracing armature, said levers including means for pressing said gripping armature toward said friction surface to clampingly engage said tracing armature, the electromagnetic effect of said magnet upon said levers being enhanced by the proximity of the free ends of the levers, whereby the flux path is substantially complete therethrough.

4. The combination as stated in claim No. 3, including a mounting for said levers adjustable with respect to said magnets, whereby the free ends of the levers may be fixed in proper relation to said magnets and armatures.

5. An electromagnetic clutch comprising driving and driven members, a magnet mounted upon one of said members, a clutch disk associated with the magnet upon the same member, a clutch disk mounted upon the other of said members, and disk engaging means mounted upon the same member which carries the magnet and comprising a lever having a free portion in the field of the magnet to be attracted thereby and an actuating portion engageable with one of said disks in a direction to press it against the other disk when the magnet is energized.

6. In a device of the character described, an electromagnetic clutch comprising a rotatably mounted clutch body having a winding adjacent one end face, an armature connected to rotate with said body in spaced relation to said face, said armature being axially movable respecting the body, non-magnetic linings on the opposed faces of the armature and body, and a driven armature interposed between said body and said first mentioned armature and engageable by said linings in motion transmitting connection with said body when said armatures are attracted by the energization of said windings.

7. A clutch and brake set in a device of the character described, comprising a pair of clutch bodies in mutually spaced relation and provided with driving connections for operating them in opposite directions, said bodies having electromagnetic windings in their respective opposed faces and means for energizing the respective windings in the course of rotation of said bodies, a shaft co-axial with said bodies and provided between said bodies with a splined hub, armatures mounted on the hub for association with the respective bodies, means for holding the respective armatures in close association with the respective bodies to be sensitively responsive to the energization of the respective windings, a brake armature mounted on said hub between said first mentioned armatures, a relatively stationary electromagnetic clutch body having electromagnetic winding in its face and interposed between said first mentioned bodies in operative association with said brake armature, the respective armatures and bodies being readily exposed for cleaning by withdrawing said shaft, said brake body, hub and the three armatures mounted on the hub being removable as a unit from between the independently mounted rotatable clutch bodies first described.

8. A power operable clutch and brake mechanism comprising driven means including a clutch friction member and a brake friction member each connected to a common driven member, a clutch friction element and a brake friction element respectively adapted for pressure friction engagement with said clutch member and brake member, power means for effecting such engagement of the brake element, and means automatically controlling said power means for effecting release of such engagements at predetermined substantially regular intervals, said power means including an alternating electric current source and a pressure effecting magnet connected with said source, and said means automatically controlling said power means including a rectifier preventing a half wave of each cycle of said current from reaching said magnet.

9. A power operable clutch mechanism comprising a rotatable driven member, a clutch element carried on said member and having opposite friction faces axially spaced apart, a power operable first driving member having a complementary friction face rotatable adjacent one of the friction faces of said clutch element, a second driving member fixed for rotation with the first driving member and having a complementary friction face rotatable adjacent the other friction face of said clutch element and electromagnetic means operative when energized to simultaneously effect pressure friction engagement of the opposite friction faces of said element with the complementary friction faces of said first and second driving members, together with means establishing a relatively light constant pressure friction engagement of each of said first and second driving members with said element.

10. A power operable brake mechanism comprising a rotatable driven member, a brake element carried on said member and having opposite friction faces axially spaced apart, a non-rotatable brake member having a complementary friction face adjacent one of the friction faces of said brake element, a second non-rotatable brake member having a complementary friction face adjacent the other friction face of said brake element, an electromagnetic means operative when energized to simultaneously effect pressure friction engagement of the opposite friction faces of said element with the complementary friction faces of said first and second brake members, said brake members each comprising magnetizable material and said electro-magnetic means when energized operating magnetically between said members to urge said simultaneous pressure friction engagement.

11. The combination with a carrier and a plurality of driven elements splined thereto for rotation therewith and for axial movement thereon, of friction members with which the respective driven elements are operatively associated, and means for detachably positioning the respective driven elements in operative association with the respective friction members, said friction members being sufficiently widely spaced axially of said carrier to permit of the axial displacement of said elements in splined connection with the carrier when said positioning means is detached to afford access to the complementary friction faces of said elements and said members for the servicing thereof.

12. The combination with a pair of substantially co-axial driving clutch members provided with spaced opposed friction surfaces and operatively connected for opposite rotation, of an intervening carrier elongated to extend between said members, a relatively stationary brake friction member, driven friction elements normally in operative frictional association with the respective driving and brake members, detachable means normally holding said elements in such association and adapted when released to permit the axial displacement of the respective elements from the associated members, a carrier upon which said elements are splined for rotation as a driven unit and upon which said elements are free for axial displacement, means detachably anchoring said friction brake member, said brake member being free when detached for displacement axially of said carrier and the space along said carrier between said driving clutch member being sufficiently in excess of the collective length of said driven elements and said brake member to afford clearance for the servicing of the friction surfaces of the respective members and elements upon relative displacement between said driving clutch members.

13. The combination with spaced mounting sleeves, of a shaft removably extending axially through the respective sleeves, a carrier mounted on the shaft between the sleeves and removable from between the sleeves upon the withdrawal of the shaft, clutch elements mounted on the carrier for removal as a unit therewith, and clutch members independently mounted upon the sleeves subject to axial displacement from the sleeves to an intermediate position from which they are removable following removal of the carrier and said elements.

14. The structure of claim 13 in combination with means providing a support between said sleeves with which the respective clutch members are peripherally engaged, said support being so disposed with reference to the radius of said members as to carry said members in substantial alignment with their respective sleeves to facilitate the withdrawal and replacement of said members.

15. The combination with spaced bearing sleeves, of a shaft withdrawably disposed to extend axially between said sleeves, a carrier mounted upon the shaft between the sleeves and removable laterally upon withdrawal of the shaft, clutch members rotatable upon the respective sleeves, complementary clutch elements splined to said carrier and provided with detachable means normally holding said elements in operative association with the respective members, said elements, when attached, being removable unitarily with said carrier in a lateral direction from between said members and sleeves, and means providing peripheral support for said elements and carrier effective when said shaft is withdrawn to hold said unit in approximate alignment with said shaft, whereby to facilitate disassembly and re-assembly.

16. The structure of claim 15 in which the unit comprising said carrier further includes a third element mounted on the carrier and a co-operating brake member normally fixed to said support and detachable therefrom to permit of the lateral removal of the entire unit when said brake member and the respective clutch elements are detached and said shaft withdrawn.

17. The combination with aligned bearing sleeves and clutch elements rotatably mounted thereon and provided with motion transmitting connections, of a shaft removably disposed to extend between said sleeves co-axially thereof, a carrier mounted on the shaft between the sleeves and removable laterally, a brake member surrounding said carrier and provided with a peripheral mounting surface, a support beneath said carrier and partially concentric with said surface with which the brake is detachably connected, clutch and brake elements mounted on the carrier and provided with means releasably holding them in operative association with the respective clutch and brake members, said elements being provided peripherally with means adapted to engage said support to hold said carrier in substantial alignment with the shaft when said shaft is withdrawn and said clutch members being provided with peripheral means engageable with said support to be carried thereon in substantial alignment with their respective sleeves, whereby to facilitate the removal and introduction of said clutch members when said carrier, said brake member, and said elements, are removed.

18. The structure of claim 17 in which said support comprises a cylindrical sector providing a shallow concavity beneath said carrier to and from which the carrier and associated elements and intervening brake member may readily be rolled as a unit, and to and from which the respective clutch members may likewise be rolled and upon which the respective clutch members are axially slidable to and from positioning upon their respective sleeves.

19. The combination with clutch members and an intervening brake member, of friction elements associated for interaction with the respective members, a carrier for said elements surrounded by said brake member, a support for said carrier from which said carrier is laterally removable, and a fixed support provided with a concave mounting surface constituting a segment of a cylinder and with which said brake member is peripherally engaged to be held in substantial alignment with the axis of said carrier, said brake member and friction elements being adapted to be rolled as a unit with said carrier from said relatively fixed support and said brake member being provided with means removably anchoring it to said fixed support and constituting clamping means carried by the fixed support and substantially wholly releasable from said brake member, whereby to avoid interference with the rolling of said unit respecting said support.

20. The structure of claim 19 in which the clamping means includes plates engaging said brake member within the outer periphery thereof at peripherally spaced points on said support and screws for tightening said plates in corresponding directions such as to urge said brake member into the concave surface of said support.

21. A device of the character described, comprising driving and driven friction members positioned for face contact, a retainer for one of said members, and spring means connected to said retainer and extending across said driven member to the driving member, whereby to bias said members for mutual frictional contact.

22. The structure of claim 21 in which said spring means comprises a tension spring provided with an anchorage from which said spring is freely disengageable.

23. The device of claim 21 in which the spring means includes a set of spring guides constituting means splining said retainer to said driving member.

24. The structure of claim 21 in which said spring means comprises a set of spring anchorages on said driving member, springs individually connected with the respective anchorages and freely removable therefrom, and spring guides extending rigidly between the retainer and said driving member and constituting a splined driving connection therebetween through which the respective springs extend.

25. In combination, a clutch and brake set, a support provided with bearing means for a driven shaft, a driven shaft mounted in the bearing means of the support and axially removable therefrom, spaced driving magnets rotatably mounted from the support concentrically with the shaft, a splined sleeve mounted on the driven shaft between said magnets, a brake magnet slidable upon the sleeve and within which the sleeve is rotatable, said support providing a bearing surface extending not to exceed 180 degrees about the brake magnet and upon which the brake magnet is heated, said surface being disposed beneath and behind the brake magnet, detent means for fixing the brake magnet with respect to the support, said detent means being releasable for the sliding movement of the brake magnet axially of the splined sleeve and also to permit the brake magnet and the sleeve to be removed as a unit from between the driving magnets upon withdrawal of said shaft, and a set of three armatures splined to said sleeve for relative axial movement thereon and respectively associated for coaction with the respective driving magnets and the brake magnet, the said armatures being removable unitarily with the brake magnet and the sleeve.

26. A device of the character described comprising an electromagnetic clutch and electromagnetic brake, a common driven shaft on which said electromagnetic clutch and brake are respectively operable, an energizing source for the electromagnetic clutch and brake including alternating current supply connections and a plurality of rectifying devices, and conducting means operatively connecting said devices between said source and the electromagnetic clutch and the electromagnetic brake, respectively, said devices being reversely connected whereby the component of the alternating current passing one of said devices will energize only the clutch while the alternating component passed by the other of said devices will energize only the brake, whereby the clutch and brake may be alternately energized with the frequency of said current by separate components thereof.

27. A device of the character described comprising a driven shaft, a brake mechanism, and a plurality of clutch mechanisms operable respectively upon said shaft, electromagnetic means for energizing the respective clutch and brake mechanisms for rendering them respectively effective upon the shaft, alternating current supply connections, a plurality of rectifiers oppositely connected in series with the source of alternating current, means including a selection switch connecting the electromagnetic means of the respective clutch mechanisms with one of said rectifiers, said selection switch determining which clutch mechanism will be energized by a given electrical component passed by said rectifier, and electrical connections from another of said rectifiers to the electromagnetic means of the brake mechanism, whereby one of said clutch mechanisms may be actuated alternately with the brake mechanism, said rectifiers being installed to supply alternate components of the alternating current to the electromagnetic means of the brake mechanism and to one of the electromagnetic means of the respective clutch mechanisms as determined by said switch.

28. A device of the character described comprising a driven shaft, friction means thereon, clutch and brake mechanisms including friction members alternatively engageable with the friction means on the shaft, power means for effecting operative pressure engagement of the respective clutch and brake friction members with said means on the shaft, and a separate means for maintaining a relatively light friction engagement of the respective members with said means on the shaft.

29. The device of claim 28 in which the means for establishing light friction between the respective members and said means comprises springs acting independently upon the respective members.

30. A power operable brake mechanism comprising a rotatable driven member, a brake element carried on said member and having opposite friction faces axially spaced apart, a non-rotatable brake member having a complementary friction face adjacent one of the friction faces of said brake element, a second non-rotatable brake member having a complementary friction face adjacent the other friction face of said brake element, power means operable to simultaneously effect pressure friction engagement of said opposite friction faces of said element with the complementary friction faces of said members and means automatically controlling said power means for effecting said simultaneous engagement and alternate release thereof at predetermined substantially constant intervals, together with means for establishing a relatively light constant pressure friction engagement of said members and element.

31. A clutch and brake device comprising a driven member, power operable clutch and brake mechanisms including means on said member with which the mechanisms coact frictionally, means for applying power to said mechanisms alternatively, means for maintaining said mechanisms under constant light pressure engagement frictionally with said driven means, the frictional pressure being increased upon the application of power to said mechanisms, and means for controlling the relative power applied to the respective mechanisms.

EMIL R. LOCHMAN.

REFERENCES CITED

The following references are of record in the file of this patent:

UNITED STATES PATENTS

| Number | Name | Date |
| --- | --- | --- |
| Re. 22,140 | Lockman | July 21, 1942 |
| 519,031 | Beaumont | May 1, 1894 |
| 624,816 | Jarvis | May 9, 1899 |
| 817,730 | Williams | Apr. 10, 1906 |
| 1,189,176 | Price | June 27, 1916 |
| 1,631,470 | Chase | June 7, 1927 |
| 1,638,542 | Mesa | Aug. 9, 1927 |
| 1,754,233 | Fisher | Apr. 15, 1930 |
| 1,864,252 | McCain et al. | June 21, 1932 |
| 1,874,383 | Tanner | Aug. 30, 1932 |
| 1,968,583 | Apple | July 31, 1934 |
| 2,029,862 | Dodge | Feb. 4, 1936 |
| 2,120,734 | Cotal | June 14, 1938 |
| 2,205,989 | Meyers et al. | June 25, 1940 |
| 2,224,924 | Pope | Dec. 17, 1940 |

FOREIGN PATENTS

| Number | Country | Date |
| --- | --- | --- |
| 4,718 | Great Britain | Mar. 26, 1915 |
| 226,192 | Great Britain | Dec. 1, 1924 |
| 319,852 | Great Britain | Oct. 3, 1929 |